United States Patent [19]

Ryley, Jr.

[11] 4,448,483
[45] May 15, 1984

[54] OPTICAL FIBER CONNECTORS WITH AUTOMATIC SUPPLY OF INDEX MATCHING FLUID AND RESERVOIRS FOR SAME

[75] Inventor: James F. Ryley, Jr., Voorhees, N.J.

[73] Assignee: TRW Inc., Redondo Beach, Calif.

[21] Appl. No.: 294,693

[22] Filed: Aug. 20, 1981

[51] Int. Cl.³ .............................................. G02B 7/26
[52] U.S. Cl. .................................................. 350/96.21
[58] Field of Search ............... 350/96.20, 96.21, 96.22

[56] References Cited

U.S. PATENT DOCUMENTS

| | | | |
|---|---|---|---|
| 3,870,395 | 3/1975 | Schicketanz | 350/96.21 |
| 3,990,779 | 11/1976 | McCartney | 350/96.21 |
| 4,030,810 | 6/1977 | Khoe | 350/96.20 |
| 4,119,362 | 10/1978 | Holzman | 350/96.18 |
| 4,186,998 | 2/1980 | Holzman | 350/96.21 |
| 4,225,214 | 9/1980 | Hodge et al. | 350/96.21 |
| 4,247,163 | 1/1981 | Lumpp et al. | 350/96.21 |
| 4,395,089 | 7/1983 | McKee | 350/96.20 |

FOREIGN PATENT DOCUMENTS 2363985 7/1975 Fed. Rep. of Germany ... 350/96.21

*Primary Examiner*—John D. Lee
*Assistant Examiner*—Frank González
*Attorney, Agent, or Firm*—Neuman, Williams, Anderson & Olson

[57] ABSTRACT

A reservoir for supplying index matching liquid to an optical fiber connection is provided employing capillary action as the means for feeding such fluid to the site of the optical fiber end engagement. The reservoir supplies index matching fluid for use in the course of a large number of connect/disconnect cycles and provides a plurality of benefits which increase the efficiency of the fiber end connection.

23 Claims, 10 Drawing Figures

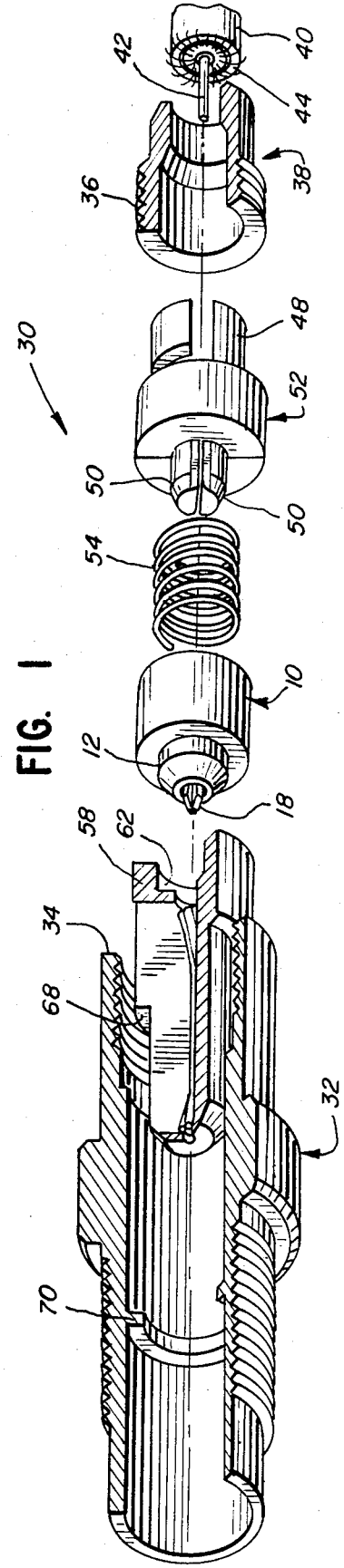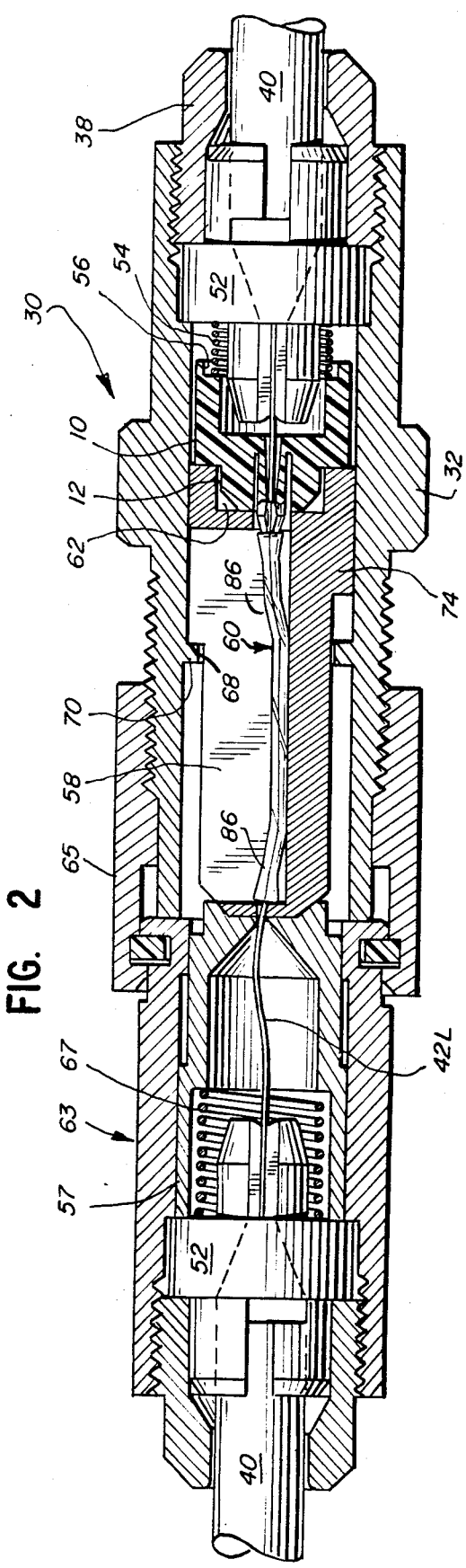
FIG. 1
FIG. 2

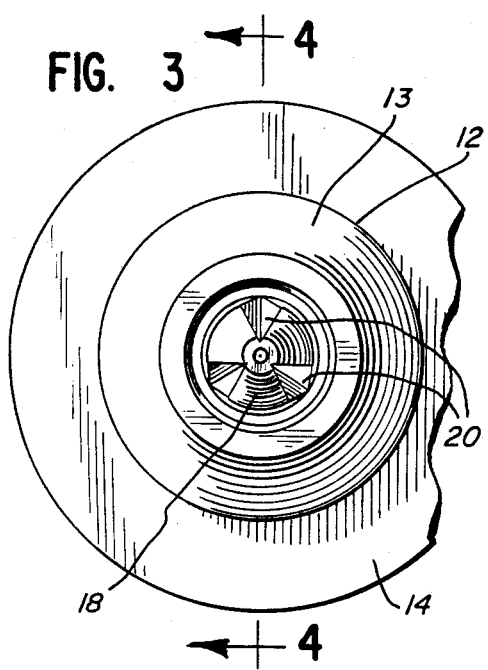
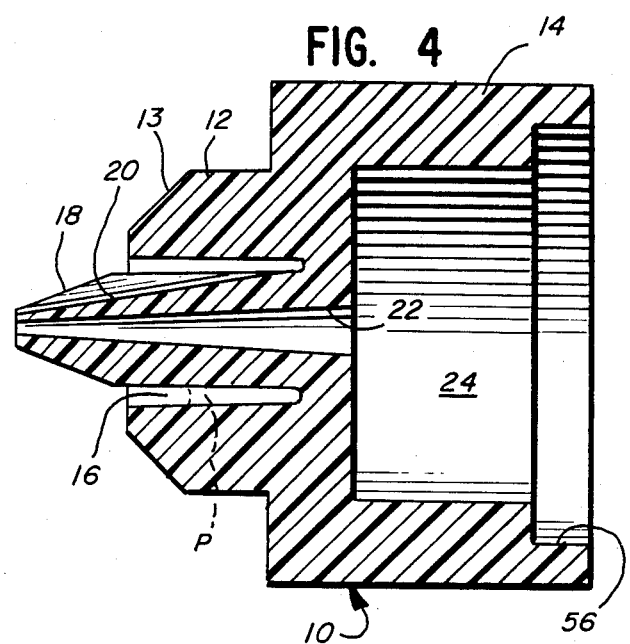
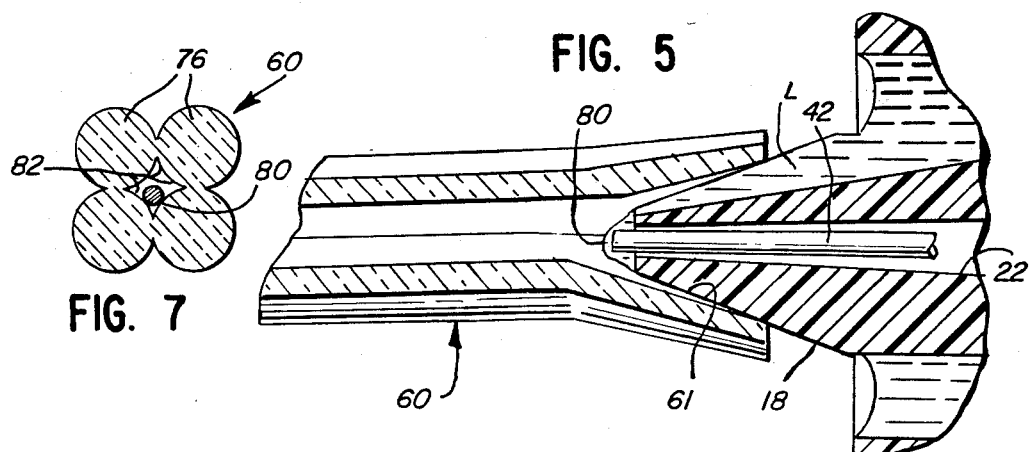
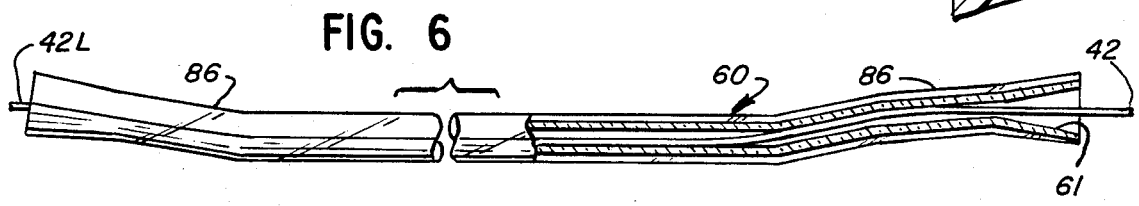
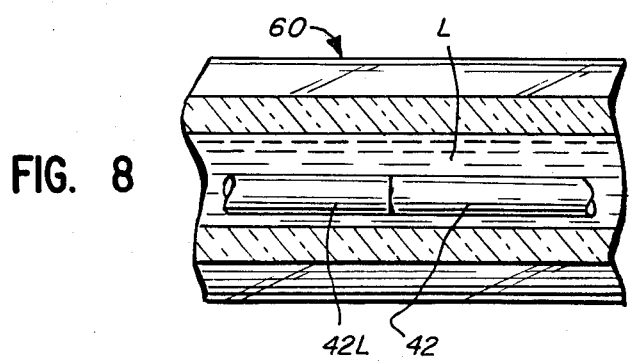

OPTICAL FIBER CONNECTORS WITH AUTOMATIC SUPPLY OF INDEX MATCHING FLUID AND RESERVOIRS FOR SAME

This invention relates to optical fiber connections, and more particularly pertains to automatically supplying index matching liquid between the ends of optical fibers disposed in a light signal transmissive engagement.

The many benefits of light wave communication are well-known, particularly those benefits comprising advantages over electrical forms of communication. Thus it is well-known that light waves are not subject to electromagnetic interference, often comprising a serious problem in communication systems employing electrical energy.

A problem warranting constant consideration in light communication is that of light loss at optical fiber junctures. Optical fibers are of small diameter, a typical fiber diameter being of the order of 0.005 inch. The ends of fibers adapted to engage in a disconnectable engagement for light transmissive purposes must be properly aligned for purposes of minimizing light losses. Thus the ends of fibers should preferably have smooth faces which abut in planar face-to-face contact for good light transmission and minimum light loss. However, defects and manufacturing tolerances in many connector systems are such as to allow undesired angular misalignment of the fiber end faces and/or axial offset or misalignment between the fiber ends. Each misalignment results in light power losses which can be very significant, if the degree of misalignment is significant. If the fiber ends do not abut in the connector juncture, reflection or Fresnel reflection losses occur at each glass-air interface.

The foregoing fiber end junction difficulties have been combated to a certain extent by the utilization of an index matching liquid as a surrounding medium for the fiber ends. The liquid surrounds and is disposed between the fiber ends. As such liquid has an index of refraction which matches that of the light-conducting glass cores of the fibers, reflection losses are substantially reduced or eliminated depending upon the relationship of the fiber ends. Thus, in a fiber end relationship in which the aligned faces of the fiber ends are slightly spaced from each other, an index matching liquid substantially reduces light losses which would be realized if air were the surrounding medium. Also, if the scribing tool employed in forming the fiber end face is unable to form a desired planar face at right angles to the fiber axis, light losses which would be significant if the fiber-surrounding medium is air, are minimized or substantially eliminated if the fiber ends engaged in a signal transmitting junction are enveloped in an index matching liquid. This is particularly true when fiber ends for connection purposes must be prepared in the field by a workman without the benefit of elaborate scribing tools. The latter are normally found in laboratories or similar locations whereat great care may be given to fiber end preparation prior to placing the same in a light-transmissive connection.

It is desirable to provide an optical fiber connector system including an index matching-liquid replenishment reservoir which enables a large number of connect-disconnect cycles to be effected without the need for manually replenishing the index matching liquid in the connector locus at which the fiber ends engage in a light signal transmissive engagement.

It should also be appreciated that in addition to minimizing light losses, the presence of an index matching liquid also provides the following benefits. The liquid effects a lubricating effect which minimizes friction on the fiber ends inserted into the aligning portion or guide of the fiber connector, and facilitates the connection step while assuring a minimum of wear on the fiber ends.

Also, the matching liquid is preferably hydrophobic so as not to absorb water. As a result, the known deleterious glass-attacking effect of water and in particular hydroxyl ions, on the glass cladding of the optical fibers within the connector is obviated.

It is an object of this invention to provide improved optical fiber connectors in which an index matching fluid is automatically supplied to the fiber connections.

It is a more specific object of the invention to provide such connectors in which an adequate supply of such fluid to the fiber connection zone will be maintained during disconnections and reconnections of fibers in the connector.

It is another object of the invention to provide such reservoir and supply systems which allow connecting of fibers in the connector in substantially a normal manner, and in connectors of conventional designs and sizes.

It is another object of this invention to provide a novel reservoir particularly adapted for continuously supplying index matching liquid to a connector location whereat fiber ends are adapted to be engaged in light transmissive connections, said supply being continuous for extended time periods despite continuous depletion of the matching liquid as a result of a large number of connect-disconnect cycles.

It is another object of this invention to provide an optical fiber index matching liquid reservoir system employing no moving parts and in which the index matching liquid automatically flows from the reservoir to the fiber end guide or other location at which the fiber ends are to be joined in a light transmissive connection.

It is another object of this invention to provide optical fiber connectors with a reservoir system assuring desired supplying of liquid to the connection area over an extremely broad temperature range.

It is another object of this invention to provide a liquid reservoir open to the atmosphere whereby vacuum generation is avoided as liquid flows from a well in the reservoir to the fiber connection area.

It is a further object of this invention to provide an index matching liquid reservoir for optical fiber applications which retains the liquid in the reservoir so as to enable the reservoir to be inverted without undesired spillage while at the same time allowing flow of the index matching liquid to proceed to the desired locus adjacent the fiber ends.

It is yet another object of this invention to provide a reservoir construction which may be readily incorporated in a connector system in such manner whereby the fiber ends are immersed in a hydrophobic index matching liquid, insuring the absence of water and hydroxyl ions which are instrumental in attacking the glass cladding and effecting light power losses and fiber strength degradation.

It is still another object of this invention to provide a novel index matching liquid reservoir construction which is inexpensive, practical and relatively simple to implement in optical fiber applications.

The above and other objects of this invention will become more apparent from the following detailed discussion when read in the light of the accompanying drawing and appended claims.

In one embodiment of the provided invention a liquid reservoir for an optical fiber connector is provided having a well formed therein containing index matching liquid. The well retains the liquid by capillary attraction force whereby the liquid is retained if the well is inverted and subjected to vibrational forces normally encountered by the connector in which it is to be disposed. At least one supply capillary is formed in the reservoir and connects the well with a reservoir end portion. The capillary attraction of the supply capillary readily effects liquid flow to a reservoir end portion or other desired locus which is adapted to engage with one end of a fiber guide also comprising a capillary. The matching liquid then flows into the guide capillary whereby fiber ends inserted into opposed guide ends are desirably immersed in the liquid. The provided reservoir has a central access passageway whereby the optical fiber may traverse the same as the reservoir simultaneously functions to supply the guide capillary.

The reservoir may be injection molded in the form of a unitary reservoir element having an annular well formed therein, or composed of discrete elements secured together as will hereinafter be described in greater detail.

For a more complete understanding of this invention, reference will now be made to the drawing wherein FIG. 1 is an exploded view of an optical fiber connector receptacle incorporating a reservoir made in accordance with the teachings of this invention;

FIG. 2 is a longitudinal sectional view illustrating the connector and reservoir elements of FIG. 1 in assembled relationship with a connector plug;

FIG. 3 is a fragmentary end elevational view illustrated on a greatly enlarged scale, of one embodiment of a reservoir for index matching liquid made in accordance with the teachings of this invention;

FIG. 4 is a sectional view of the reservoir embodiment of FIG. 3 taken on line 4—4 thereof;

FIG. 5 is a fragmentary sectional view illustrating the interengagement between the flared opening of an optical fiber guide and a mating end of a reservoir made in accordance with the teachings of this invention;

FIG. 6 is a longitudinal view, partly broken away, of a fiber guide adapted to receive index matching liquid from a reservoir of this invention and which may be employed for purposes of guiding optical fiber ends into light transmissive engagement;

FIG. 7 is a transverse sectional view of the guide of FIG. 6;

FIG. 8 is a fragmentary sectional view partly in elevation, illustrating the manner whereby index matching liquid may be employed in an optical fiber guide for purposes of minimizing reflection losses;

Figure 9:
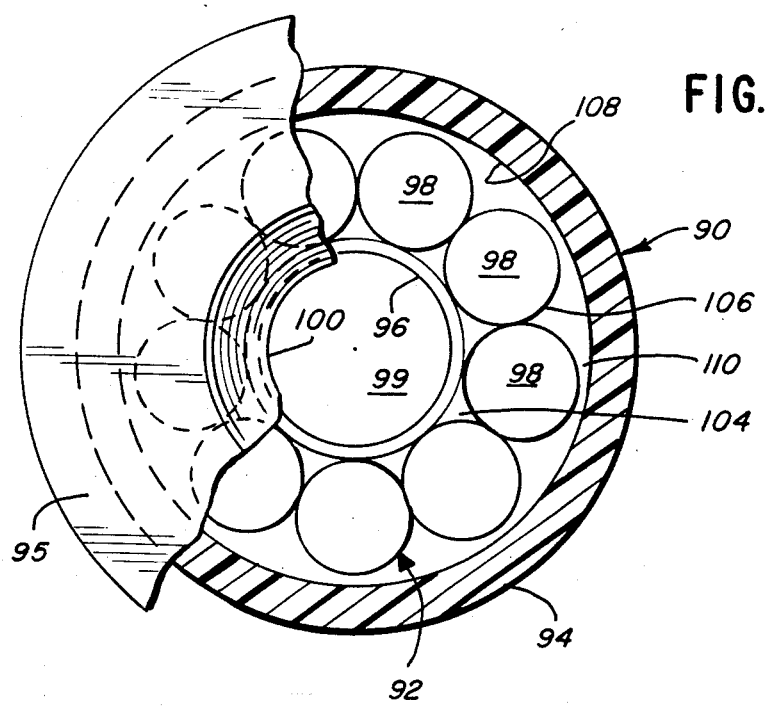
FIG. 9 is an end elevational view partly broken away of a second embodiment of an index matching liquid reservoir made in accordance with this invention.

Referring now to FIG. 4, a longitudinal sectional view is illustrated of an index matching liquid reservoir element 10 which may be readily injection molded from a variety of plastic materials including thermoplastic polyesters, nylon and polycarbonates. The reservoir 10 has an intermediate, generally cylindrical boss portion 12 extending from a larger cylindrical base portion 14 and having an end shoulder surface 13 of conic section. Concentrically disposed in the reservoir element with portion 12 is an annular well recess 16 comprising a liquid-containing portion of the reservoir within which index matching liquid may be disposed for supplying between fiber ends.

It is the purpose of such an index matching liquid to minimize any reflection losses between the ends of optical fibers engaged in a light transmissive connection in a connector, and thereby minimize light power losses between the fibers in the course of light transmission through such connection. The use of index matching liquids in optical fiber connectors is well-known in the art. However, no practical reservoir for maintaining matching liquid in an optical fiber connector has been yet devised by the prior art. Such reservoir should assure the supply of an adequate quantity of matching liquid adjacent the fiber ends through a large number of connect-disconnect cycles during which the fiber ends are inserted in and withdrawn from the connector guide portion wherein fiber ends engage in the light transmissive connection.

The reservoir well 16 is of such dimensions that when an index matching liquid is placed therein, the index matching liquid will not drain or run off from well 16 even though the reservoir is positioned with the portion 12 disposed lowermost in the vertical plane and/or is subjected to dynamic shock or acceleration forces. The matching liquid is restrained by virtue of the adhesive attraction of the liquid for the well-defining surfaces present in the reservoir 10.

Extending from the annular well 16 is a generally truncated conical, central, reservoir nose portion 18 having disposed thereon at 120° intervals as is more clearly seen from FIG. 3, channel-defining surfaces 20 which extend from the innermost or deepest portion of the well 16 in which is disposed the index matching liquid. The liquid within the well 16 proceeds up the diverging channel-defining surfaces 20 by capillary attraction to reach the distal end of the nose portion 18 of the reservoir 10.

It is evident from the foregoing description that two capillary forces are present in the reservoir 10 made in accordance with this invention. The well 16 must retain the index matching liquid within the well and prevent spilling from the reservoir when the reservoir is disposed in the vertical plane with the nose portion 18 disposed lowermost as above mentioned. In addition, the capillary "pull" of the surfaces 20 defining the capillary channels in the nose portion 18 of the reservoir must be greater than the capillary attraction which the surfaces of the reservoir which define the well 16 exert on such index matching liquid. Under such conditions a portion of the liquid may move by capillary attraction out of the well 16, up the surfaces 20 to the end of the nose 18 of the reservoir. From the nose the liquid may be attracted by a fiber guide capillary passageway as will be more clearly seen hereinafter.

The height to which the index matching liquid must rise within the reservoir to reach a fiber guide, that is, the distance the liquid must travel from the bottom of the well 16 in the embodiment of FIG. 4 to the end of the nose portion 18, may be construed as a capillary force which is in equilibrium with the forces of gravity tending to retain the liquid within the well 16 when the reservoir 10 is disposed in the vertical plane with the nose portion 18 disposed uppermost and the well 16 disposed lowermost.

For a simple concentric tube capillary in which liquid rises in the inter-tube annulus, the height Y to which liquid will rise in such capillary until it is in equilibrium with gravitational forces may be expressed by the equation:

$$Y = \frac{2 S_{LV} \cos \theta}{\rho g (r_2 - r_1)} \text{ wherein:}$$

Y = column height (cms)
$S_{LV}$ = surface tension of the liquid (dynes/cm)
$\theta$ = liquid contact angle between liquid and tube surfaces
$\rho$ = liquid density (gms/cm$^3$)
g = acceleration due to gravity (cm/sec$^2$)
$r_2$ = inner diameter of outer tube (cm)
$r_1$ = outer diameter of inner tube (cm)

The distance the reservoir must feed the index matching liquid must, then, be somewhat less than y at which distance the forces are equal and no additional capillary flow beyond Y would occur.

Thus in the reservoirs of this invention the capillary passages must feed the liquid a distance less than the equilibrium "distance Y" so the fiber guide will be provided with a constant supply of index matching liquid. The guide well must also be designed so the liquid will not be lost to the surrounding environment by spillage.

As seen in FIG. 4, centrally disposed within the reservoir 10 is a fiber passageway 22 which tapers from inner recess 24 of the reservoir 10 to the distal end of the reservoir tapered nose 18. Thus, the fiber is admitted through the reservoir. Concomitantly, the liquid is fed circumjacent the fiber, conveniently for further capillary transfer of the liquid along the fiber to the connection zone.

The reservoir 10 of FIGS. 3 and 4 is designed for use in a connector similar to the connector of U.S. Hodge et al. Pat. No. 4,225,214 owned by the assignee of this application, and the disclosure of which is incorporated herein by reference. The connector of the latter patent is sold by the Cinch Division of TRW Inc. of Elk Grove Village, Illinois under the name Optalign.

FIG. 2 illustrates a connector made in accordance with the teachings of U.S. Pat. No. 4,225,214 including mating male and female connector portions. Illustrated receptacle 30 of the exploded view of FIG. 1 comprises a female portion of an optical fiber connector substantially in accordance with the teachings of U.S. Pat. No. 4,225,214 and which has been modified so as to incorporate therein a reservoir 10. That is, FIG. 1 of the drawing illustrates reservoir 10 in combination with remaining elements of the receptacle portion of an Optalign connector.

The connector receptacle 30 of FIGS. 1 and 2 comprises a housing 32 having female threads 34 disposed at one end for purposes of engaging male threads 36 of clamp nut 38 in the manner more clearly seen in the assembly view of FIG. 2. Optical fiber cable 40 of well-known construction having a central optical fiber 42 surrounded by a plurality of strength members 44 and an outer sheath enters one end of receptacle 30. The cable 40 may be of a type sold under the brand name Siecor by Siecor Cables, Inc. of Horseheads, New York. The fiber 42 comprises a core appropriately clad with a lower-index cladding to minimize light losses.

In the normal course of assembly of the elements of FIG. 1, a distal length of the cable 40 has the sheathing stripped therefrom so as to leave an end portion of the central optical fiber 42 exposed whereafter the cable and exposed fiber are clamped between jaws 48 and 50 respectively of clamp 52.

Clamp 52 is particularly adapted for use in connection with an optical fiber cables and is of the type disclosed in Lumpp et al. U.S. Pat. No. 4,247,163 and of the type disclosed in the improvement application of William McKee U.S. Pat. No. 4,395,089. Such patent and application are owned by the assignee of the invention of this application and the disclosures thereof are incorporated herein by reference.

Following assembly of the optical fiber cable 40 with the clamp nut 38 and the fiber clamp 52 the latter are inserted into the connector housing 32 in the manner illustrated in FIG. 2, for assembly with a spring member 54 which is received over the jaws 50 of the fiber clamp 52. One end of spring 54 is also nestably received in annular recess 56 of illustrated reservoir 10 in the manner more clearly seen in FIG. 2. Reservoir 10 and a slug 58 which is slotted along a portion of the length thereof for purposes of receiving an optical fiber guide 60 are inserted into the connector housing 32 prior to insertion of the aforedescribed connector elements. Guide 60 may be secured to the bottom of such slug slot by means of an epoxy adhesive or the like in the manner illustrated in FIG. 2.

As will be noted from both FIGS. 1 and 2, slug 58 has an annular recess 62 at one end for interfitting engagement with intermediate conical portion 12 of reservoir 10 in the manner more clearly seen in FIG. 2 and has a stop shoulder 68 which engages stop shoulder 70 disposed about the inner periphery of the connector housing 32. For purposes of desirably positioning the slug 58 and optical fiber guide 60 relative to housing 32, key 74 integrally formed with the slug is received in a housing keyway.

It is the function of spring 54 to exert a slight forward pressure on reservoir 10 relative to fiber clamp 52 which is locked in an interior recess of the connector housing 32 in a manner more clearly seen in FIG. 2. In the course of such forward urging, the distal tip of conical nose 18 of the reservoir 10 will be received in a mating, flared opening 61 of the guide 60 in the manner more clearly seen in the enlarged view of FIG. 5. This places the capillary feed channels 20 in communication with the guide 60 for further capillary movement of the liquid into the guide to immerse the fiber junction.

It should be noted that guide 60 is of the type disclosed in Hodge co-pending application Ser. No. 968,045, filed Dec. 8, 1978. The latter application is commonly owned with the invention of this application and the disclosure of such application is incorporated herein by reference.

Guide 60 may be composed of four glass rods 78 which are fused together to form an interstitial passageway 80 as seen in the sectional view of FIG. 7. The glass has an index of refraction preferably matching that of the fiber core cladding to minimize light loss. The passageway 80 comprises cusps 82, each cusp being defined by converging surfaces of adjacent glass rods 78. Fiber ends adapted to engage in an efficient light transmissive connection are precisely located in the interstitial passageway which is of larger effective sectional dimensions than the fiber cross-section. Such dimension allows easy entry of the fibers into the guide and yet precise locating of the fiber ends adapted to abut in a light transmissive connection on a desired cusp comprising a fiber-aligning track is provided by the guide 60. The latter location is dictated by guided bending of the fibers in the course of traversing the guide 60.

Specifically, by virtue of opposed bent end portions 86 of guide 60, the bends being more apparent from FIGS. 2 and 6, upon insertion of fibers into the opposed ends of the guide 60 they will be guidingly bent into a lower cusp in the manner illustrated in the sectional view of FIG. 7. The fibers will be precisely located in alignment and in abutment with one another within the interior interstitial passageway 80 despite the fact that the cross-section of such passageway 80 is larger than the cross-section of the optical fibers 42 inserted therein.

In the normal course of reservoir operation, during assembly of the connector elements into the condition of FIG. 2, index matching liquid will proceed by capillary attraction from the well portion 16 of the reservoir 10 along the channels defined by surfaces 20 in nose portion 18 of reservoir 10 until the end of the reservoir cone 18 is reached. Subsequently the capillary attraction of the guide 60 will be operational on the index matching liquid to further attract index matching liquid L illustrated in FIG. 5 into the interior interstitial passageway 80 of the guide 60 in the manner illustrated. The passageway 80 will fill with liquid from reservoir 10 until the start of the opposed flared end 61 opposite the reservoir whereat the capillary action will terminate because of the end of the capillary passageway 80, i.e., the enlarged flared end exceeds the size parameter for further capillary movement of the liquid. Thus, when the fibers are inserted into guide 60, flare 61 opposite the reservoir will serve to receive the matching liquid volume displaced by one or both fibers.

It is apparent that fiber access passageway 22 enlarges from nose 18 rearwardly to recess 24 of the reservoir. The widening passageway will prevent significant capillary flow in passageway 22. If desired, the wall defining passageway 22 may be wetted with any of a variety of anti-wetting agents and dried prior to reservoir use whereby any flow of the index matching liquid in passageway 22 is avoided. Exemplary agents are zonyl RP and TLF 4029B manufactured by E. I. du Pont.

The provided reservoir enables the index matching liquid L to envelope the terminal ends of the fibers engaged in the connector guide 60 in light transmissive engagement as illustrated in FIG. 8. By surrounding the end faces of the fibers which may not be perfectly planar, the liquid L minimizes any reflection losses which would normally occur if the end faces were surrounded by air.

Fiber 42L in FIG. 8 is inserted in guide 60 as the connector plug 63 of FIG. 2 is connected to receptacle 30 by means of threaded coupling ring 65. As the connector halves mate, retractable piston 57 in plug 63 abuts the end of slug 58 and retracts by compressing spring 67, thereby allowing the end of fiber 42L to proceed into guide 60 to meet the end of fiber 42 in an efficient light transmissive engagement on a common cusp 82.

By way of example and not limitation, reservoir 10 of FIGS. 3 and 4 may have the following dimensions. Housing portion 14 may have an outer diameter of 0.330 inch and a length of 0.215 inch. Intermediate portion 12 may have a diameter of 0.210 inch and length of 0.095 inch. Nose portion 18, including the 20° tapered end portion, may extend 0.075 inch from portion 12 and have a base diameter of 0.07 inch in the portion corresponding to well 16. Well 16 may be 0.118 inch deep. Such a reservoir will function in the manner above described, when employed with a silicone index matching liquid sold under the brand name Dow Corning 200. FIG. 4 depicts on an enlarged scale the reservoir with all elements thereof in proper relative proportion.

Figure 10:
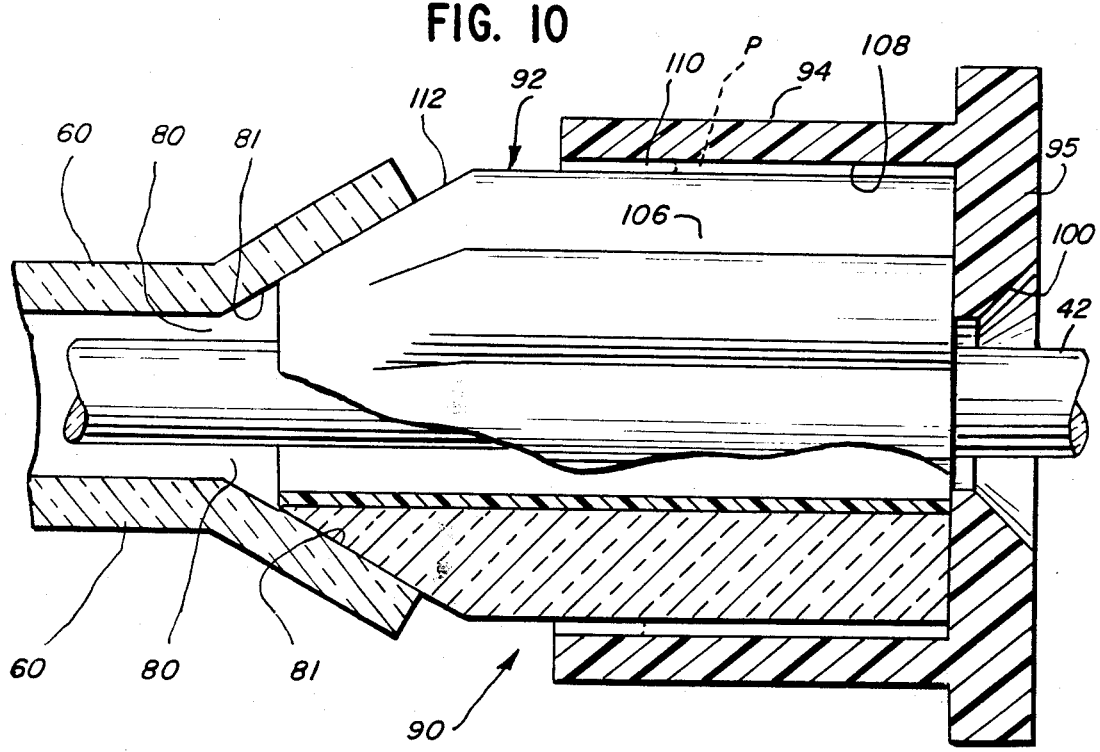
FIG. 10 is a fragmentary sectional view partly in elevation similar to that of FIG. 5 illustrating the modified reservoir of FIG. 9 in engagement with the flared end of an optical fiber guide.

Another embodiment of a reservoir formed in accordance with the teachings of this invention is illustrated in FIGS. 9 and 10. In FIG. 9 a multi-part reservoir 90 is illustrated comprising a centrally disposed capillary member 92 and a surrounding outer housing member 94. The capillary member 92 comprises an assembly of a central tubular member 96 having disposed about the outer periphery thereof a plurality of rods (or tubes) 98 which may be formed from glass or other material having desired surface energy in contacting the matching liquid. The internal axial bore 99 of the tubular member 96 comprises a fiber access passageway whereby the fiber may traverse the length of the reservoir 90 for normal entry into a connection guide 60.

The central capillary member 92 if formed of glass may be formed of relatively large diameter components and then reduced to a desired size by heating and simultaneously drawing the access tube 96 and the surrounding glass rods until the desired size for such assembly is obtained. Simultaneously with the drawing operation, the glass rods 98 will be fused to the outer periphery of the central tubular member 96.

The central capillary element 92 may be secured to the bottom of housing 94 by an epoxy adhesive or the like. The bottom 95 of the housing 94 has a flared opening 100 for ready passage of an optical fiber 42 which traverses the length of the tube 96 and the length of the illustrated reservoir assembly 90. No liquid is able to pass into the nonoperative inner interstitial passageways 104 more clearly seen in FIG. 9, defined by the rods 98 and the outer periphery of the tube 96. Capillary action is prevented by the liquid-tight seal between the bottom of the central capillary member 92 and the bottom 95 of the housing 94. However, liquid is able to pass by capillary attraction forward along fluid delivery channels 106 defined by converging surfaces of the rods 98 which effect a tangential contact where engaged in mutual abutment, in the manner illustrated in FIG. 9. The rods may be fused together at such contacts.

It will be further noted from FIGS. 9 and 10 that the outermost peripheries of the rods 98 defining the central capillary member 92 of the reservoir are spaced from inner periphery 108 of the housing 94. An annular well 110 is defined between the inner wall of the reservoir housing 94 and the outer periphery of the central capillary member 92, into which an index matching liquid may be deposited for forming a pool of index matching liquid. The liquid will be retained in the capillary well 110 and the channels 106 when the reservoir assembly 90 is inverted with tapered nose portion 112 of the central capillary member 92 disposed lowermost in the vertical plane, or in any other position, thereby preventing spillage of such index matching liquid from the reservoir. The attraction of the liquid for the fluid delivery channels 106 is such that the index matching liquid also may readily move in the channels 106 from the well of index matching liquid disposed within the annular well 110 regardless of the reservoir position.

In the construction of FIGS. 9 and 10 the capillary well and channels must, of course, be properly proportioned so that the capillary pull of the well 110 is less than that of the feed channels 106. Such relationship enables the index matching liquid to arrive at the fiber guide 60 in the manner illustrated in FIG. 10, which comprises a figure similar to FIG. 5. In FIG. 10 tapered nose portion 112 of the central capillary member 92 interfits with flared opening 81 of the glass rod guide 60. As with the reservoir member 10, index matching liquid will proceed up the guide channels 106 of central capillary member 92 until it arrives at the top of the nose portion 112 of the central capillary member whereafter the capillary attraction of the passageway 80 of the guide 60 is effective to pull the liquid into the interior of the guide.

The nose portion 112 of the central capillary member 92 may be formed by grinding the end of such capillary member with an abrasion wheel until the desired conical periphery has been formed. The slope of the conical end 112 should be such so as to engage in a substantially surface-to-surface relationship with the flared opening 81 defining the end of the interstitial passageway 80 of the guide 16, enabling the index matching liquid to proceed to the interior of the interstitial passageway by capillary action. Capillary passageways must, of course, be present in the ground-down tapered nose portion to interconnect the capillaries of the full cylindrical portion of element 92 with the guide capillary passageway 80.

In addition to silicone oils sold by Dow Corning a large number of liquids is known to the art and will work to advantage, such as a large number of laboratory liquids including glycerin. The liquids should be operational over a large temperature range and liquids are known which function in a satisfactory manner over the range of $-45°$ C. to $+100°$ C. It is apparent that the dimensions of any reservoir made in accordance with this invention may be readily arrived at by one skilled in the art to meet the basic liquid flow and retention requirements necessary. Such requirements are that the capillary force of the reservoir be strong enough to provide the necessary liquid height to reach the guide when working against gravity. The capillary pull of the reservoir liquid well must be less than that of the reservoir capillary channel or channels to allow the liquid to proceed up the channels to the end of the reservoir and into the guide. Also, the pull of the reservoir must be large enough to preclude spilling into the connector as might be occasioned by gravity or other forces such as vibration forces expected to be reasonably encountered in the normal course of connector use.

A similar size relationship exists in the comparable reservoir elements in the reservoir embodiment illustrated in FIGS. 3 and 4.

In the reservoir embodiment 90 of FIGS. 9 and 10 the maximum distance Y to which the liquid may extend from the well 110 is expressed by the equation:

$$Y = \frac{(3r_R + 2r_H) S_{LV} \cos \theta}{\rho g \left[ r_H^2 - \frac{n}{\pi}(r_R^2 + r_R r_T) \cos \frac{180}{n} - \frac{3}{2} r_R^2 \right]}$$

wherein:
$r_R$ = rod radius (cm)
$r_H$ = inner radius of the housing (cm)
$r_T$ = access tube outer radius (cm)
$\rho$ = index matching fluid density (gm/cm$^3$)
$g$ = acceleration due to gravity (cm/sec$^2$)
$S_{LV}$ = surface tension (dynes/cm)
$\theta$ = contact angle between the matching liquid and the material of the reservoir elements 92 and 94 assuming they are made of same material (degrees)
$n$ = number of rods
$Y$ = height (cm)

In accordance with this invention a desired reservoir is empirically designed to provide the desired capillary flow and index liquid retention. The specific reservoir design may then be mathematically analyzed if desired to provide a desired Y formula defining the height to which the liquid may extend by capillary force. Assuming it is desired to form a reservoir from a new material, the $\theta$ or angle of contact with the index matching liquid is determined for the new material, and the capillary dimensions are altered to provide the same Y or capillary force. Thus assuming a new material of composition for a reservoir provides decreased capillary force as reflected in $\theta$, the latter decrease may be offset by increasing $r_R$ and forming deeper tighter cusps to increase the capillarity. The desired Y may also be maintained by manipulating other formula factors.

It is thus apparent that a number of variables are present in the reservoir system which may be utilized for purposes of arriving at a desired reservoir size with desired well dimensions and fluid channel dimensions.

A reservoir of the type disclosed in the drawings is able to supply adequate index matching liquid for a number of connect and disconnect operations in excess of 50 without the need for replenishing the liquid within the reservoir. Liquid may be readily inserted into the reservoir by means of an eye dropper or the like. Care should be taken during liquid addition to the reservoir well to insure the absence of air entrapment which could result in light losses if present in the liquid surrounding the fiber ends engaged in a light transmissive connection. However, if any air is entrapped in the course of the reservoir filling operation, it may be readily dissipated by insertion of the fine wire for purposes of dispelling the air by allowing the same to rise to the surface of the liquid.

In order to eliminate air entrapment in the normal course of connector operation, it is necessary that the rate of fiber withdrawal from the fiber connector be controlled so as not to exceed a certain linear speed. It has been found that if the fiber is retracted at a rate of no greater than one tenth inch per second, the danger of air entrapment as a result of the forces imparted to the index matching liquid during fiber withdrawal from the guide are substantially avoided.

The reservoirs above described perform satisfactorily with respect to the vibration portion of military standard 202E wherein the reservoir was subjected to a fixed displacement at high frequency for purposes of endeavoring to shake the matching liquid free from the reservoir.

Although two specific reservoir embodiments are illustrated in the drawing it is apparent to those skilled in the art that modifications may be made in the structure illustrated which modifications remain within the ambit of the basic invention disclosed. Thus, the capillaries in the illustrated reservoir embodiments formed by grooves and cusps may be substituted by porous elements composed of materials such as sintered glass, glass wool and textile-type materials. By packing the well portions of the above described reservoirs with a porous material as at "P" in FIGS. 4 and 10, the well storage volume could be greatly increased without loss of retention against gravitational forces.

Also, although the above-described reservoir embodiments are illustrated in combination with a guide providing capillary attaction for inducing the flow of index matching liquid into the interior thereof, other guide embodiments may be employed. Thus, a guide which generates or is provided with a partial vacuum for purposes of inducing liquid flow thereinto in the normal course of use will work to advantage with the provided reservoir. Means in a fiber guide other than capillary attraction may thus be employed for inducing liquid flow into a guide passageway connected to a reservoir capillary.

It is believed apparent from the foregoing description that the reservoir provided is simple in construction, being composed of no moving parts. The provided system is flexible so as to be able to provide desired capillary action of a particular fluid employed by desired arrangement of the various dimensional variables and material of composition variables.

Although the illustrated connector embodiment depicts a reservoir in the receptacle portion of the connector, the reservoir may be incorporated to equal advantage in the connector plug portion upon appropriate design of the latter portion for housing the same. Also, a reservoir may be disposed in both the plug and receptacle portions.

It is believed that the foregoing has made apparent a number of modifications which may be made in the inventive reservoir construction disclosed without departing from the spirit of this invention. It is intended, therefore, that this invention be limited only by the scope of the appended claims.

What is claimed is:

1. In combination a guide including a passageway for receiving and aligning the ends of optical fibers to be joined in light transmissive relation; a liquid reservoir including a well for storing a liquid; capillary means communicating said well and passageway, whereby liquid disposed in said well may flow by capillary action from said well into said passageway; and said well and capillary means being of such dimensions as to retain liquid contained in said reservoir against spillage occasioned by gravitational forces.

2. The combination of claim 1 in which said reservoir and guide are formed for interfitting engagement; said capillary means and said guide passageway interconnecting during said interfitting engagement whereby liquid in said reservoir well proceeds along said capillary means into said guide.

3. The combination of claim 1 in which said capillary means comprises a plurality of channels of substantially V-shaped cross-section extending from the bottom of said well and which progressively increase in cross-section with distance from the well bottom.

4. The combination of claim 3 in which three channels extend along axes disposed 120° apart from the well bottom and terminate on a reservoir tapered nose portion extending centrally of said reservoir.

5. A combination for supplying index matching liquid adjacent the ends of optical fibers engaging in light transmissive connections, comprising an optical fiber guide having a passageway capillary within which the ends of optical fibers are adapted to abut in light-transmissive connections; a reservoir for supplying index matching liquid to said passageway having a well for holding index matching liquid; capillary means in said reservoir extending from said well to one end of said reservoir; said reservoir one end being configured to interfit with one end of said fiber guide passageway; the capillarity of said passageway drawing index matching liquid from said reservoir one end and into said passageway.

6. The combination of claim 1 or 5 in which said well is a capillary which exerts an attraction for the index matching liquid disposed therein which exceeds gravitational forces acting to spill such liquid from such well.

7. The combination of claim 6 in which said guide has at least one flared opening and said reservoir has a mating tapered end in communication with said capillary means.

8. The combination of claim 6 in which the capillary pull of said reservoir well is less than the combined capillary attraction of said reservoir capillary means and said guide passageway.

9. A combination comprising a guide containing a capillary passageway for receiving and aligning the ends of optical fibers in light transmissive relation; a reservoir for supplying liquid to said capillary passageway having a well for containing the liquid; said guide and reservoir being formed for interengagement and said reservoir including capillary means communicating said well and capillary passageway in the interengaged condition of said guide and reservoir, whereby liquid in said reservoir well proceeds from said well through said capillary means to said guide capillary passageway.

10. The combination of claim 9 in which said reservoir has a tapered end portion to which said capillary means extend and said passageway has a flared end adapted to receive the tapered end portion of said reservoir, whereby liquid in said reservoir tapered end portion proceeds into the passageway.

11. The combination of claim 9 in which said well comprises a capillary preventing spillage of liquid contained therein by gravitational forces.

12. The combination of claim 9 in which said well and capillary means contain porus material to be saturated with said liquid.

13. The combination of claim 9 in which optical fiber ends are disposed in said guide passageway and are surrounded by liquid supplied from said reservoir well and having an index of refraction substantially matching the indices of refraction of the cores of said optical fiber ends.

14. The combination of claim 13 in which said reservoir is longitudinally apertured and one of said optical fiber ends traverses such longitudinal aperture prior to entering said guide passageway.

15. The combination of claim 1, 5 or 9 in further combination with a connector housing in which said guide and reservoir are disposed, and means in said housing for resiliently biasing said guide and reservoir into interengagement.

16. A combination for supplying index matching liquid for use between the ends of optical fibers engaging in light transmissive connections, comprising a well for containing index matching liquid; at least one capillary passage for such liquid connecting said well with one end of said reservoir; said well being of such configuration as to exert a capillary pull on index matching liquid therein which is greater than the gravitational forces imparted to the liquid in said well when said reservoir is in the inverted position whereby index matching liquid will not spill therefrom; said well also exerting a capillary pull on such index matching liquid which is less than the capillary pull of said at least one capillary passage whereby liquid in said at least one capillary passage may extend by capillary action from said reservoir along the length of said at least one capillary passage regardless of the disposition of said reservoir and well relative to the vertical plane; an open-ended, fiber-receiving passageway in which the ends of fibers to be joined in a light-transmissive connection are joined; said passageway being connected to the end of said at least one capillary; said passageway comprising a capillary for drawing liquid from said reservoir one end.

17. The combination of claim 16 in which said reservoir includes an optical fiber passageway extending adjacent said at least one capillary passage whereby an optical fiber extending through said passageway may be wetted by index matching liquid disposed at the end of said at least one capillary.

18. The combination of claim 1, 5 or 16 in which optical fiber ends are disposed in said guide passageway and the end faces thereof are surrounded by index matching fluid.

19. The combination of claim 1, 5, 9 or 16 in which said reservoir is molded in the form of an integral unit having a plurality of capillaries extending from said well formed therein.

20. The combination of claim 1, 5, 9 or 16 in which said reservoir comprises a capillary member formed of a plurality of fused glass rods disposed about a fiber access passageway; said member extending from a liquid-containing housing encompassing one end portion of said member.

21. The combination of claim 1, 5, 9 or 16 in which said passageway has at least one enlarged end which does not exert capillary attraction and comprises a reservoir into which index matching liquid disposed in said passageway may be displaced by optical fibers inserted into opposed passageway ends.

22. In a method of effecting a low loss connection between optical fiber ends adapted to be disposed in optical transmissive relation within an open-ended guide passageway, the steps comprising providing a supply of index matching liquid substantially matching the index of refraction of the cores of said fibers, and conducting said liquid from said supply to said guide passageway by capillary action to at least partially fill said passageway with liquid from said reservoir, and inserting optical fiber ends into opposite ends of said passageway and into light transmitting relation, whereby the ends of said fibers are enveloped in said index matching liquid.

23. The method of claim 22 in which said reservoir is apertured for passage of one of said optical fibers in combination with the step of threading said one optical fiber through said reservoir aperture in the course of entering said guide capillary.

* * * * *